Figure 1:
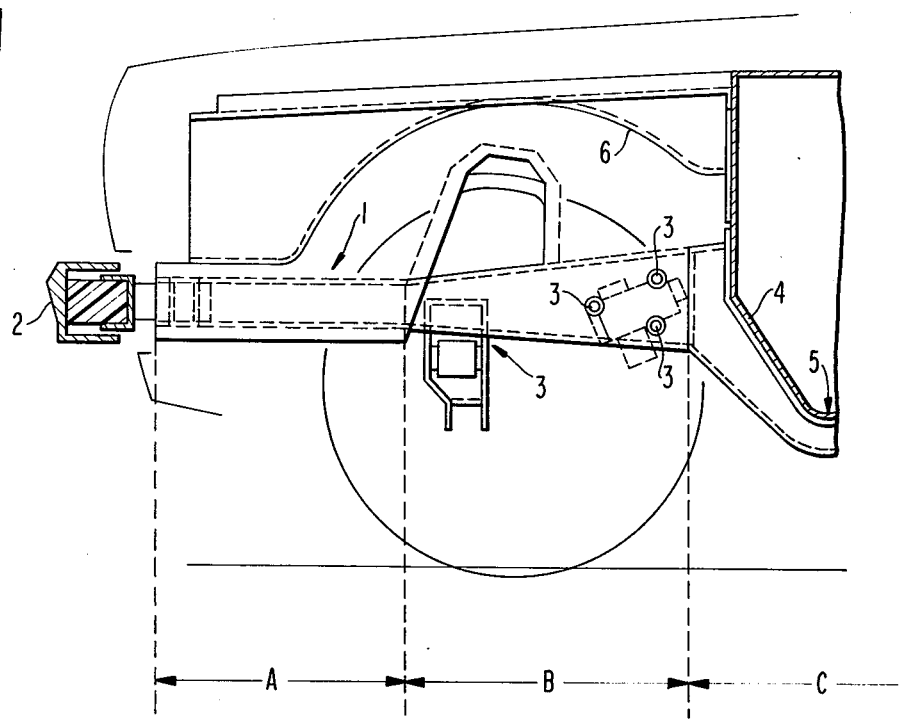

United States Patent [19]

Klie et al.

[11] 4,183,574

[45] Jan. 15, 1980

[54] FORWARD LONGITUDINAL BEARER CONSTRUCTED AS CLOSED HOLLOW BEARER

[75] Inventors: Wolfgang Klie, Korntal; Hermann Renner, Magstadt; Dieter Weidemann, Weil der Stadt; Helmut Weisshappel, Sindelfingen, all of Fed. Rep. of Germany

[73] Assignee: Daimler-Benz Aktiengesellschaft, Fed. Rep. of Germany

[21] Appl. No.: 789,942

[22] Filed: Apr. 22, 1977

[30] Foreign Application Priority Data

Apr. 30, 1976 [DE] Fed. Rep. of Germany ....... 2619173

[51] Int. Cl.² .......................................... D62D 27/00
[52] U.S. Cl. ..................... 296/188; 280/781; 296/198
[58] Field of Search .............. 296/28 R, 28 F, 28 E, 296/28 J, 28 K; 280/106 R, 781, 784, 785, 790; 180/64 R; 293/63, 64

[56] References Cited

U.S. PATENT DOCUMENTS

| 2,551,528 | 5/1951 | Darrin | 280/106 R |
| 3,188,110 | 6/1965 | Wessells | 280/781 |
| 3,556,552 | 1/1971 | Deckert | 280/106 R |
| 3,822,907 | 7/1974 | Appel | 280/784 |
| 3,856,324 | 12/1974 | Saitoh | 280/106 R |
| 4,030,772 | 6/1977 | Jacob | 280/106 R |

*Primary Examiner*—John A. Pekar
*Assistant Examiner*—John A. Carroll
*Attorney, Agent, or Firm*—Craig and Antonelli

[57] ABSTRACT

A forward longitudinal bearer of a motor vehicle constructed as closed, hollow bearer with an impact-near energy-absorbing part which is so composed sectionwise that three series-connected zones result, of which the center zone is located within the area of aggregate support points and exceeds the two adjoining zones as regards their rigidity by the use of materials of increased strength and/or greater wall thickness.

14 Claims, 2 Drawing Figures

FORWARD LONGITUDINAL BEARER CONSTRUCTED AS CLOSED HOLLOW BEARER

The present invention relates to a forward longitudinal bearer of a motor vehicle constructed as closed hollow bearer with an impact-near energy-absorbing part.

The two forward longitudinal bearers which have to fulfill a number of requirements count among the most important front-sectional structural parts, especially in front engine vehicles. Thus, in case of an impact, they have to provide a portion of the energy absorption and they have to transmit the remaining forces into the passenger cell structure. Furthermore, they must include support points for aggregates such as, for example, the internal combustion engine and the steering gear and must be designed for the absorption of the forces introduced by way of these support points. Added to these forces are additionally the loads and stresses which occur during the driving operation.

As a rule, such longitudinal bearers are constructed as closed, hollow bearers and consist of a one-piece inner shell with a sheet-metal closure member which is connected with the sheet-metal wheel casing within the area of the latter. It is readily apparent that the manufacture of a longitudinal bearer fully satisfying all requirements is difficult and one is more or less forced to provide highly stressed areas with reinforcements which, however, again negatively influence the corrosion protection behavior.

It is therefore the task of the present invention to provide a longitudinal bearer which is constructed more favorable as regards repairs and which fully satisfies all load conditions without thereby requiring an excessive expenditure.

Accordingly, a forward longitudinal bearer of a motor vehicle constructed as closed, hollow bearer with an impact-near energy-absorbing part is proposed, whereby according to the present invention the longitudinal bearer is assembled section-wise in such a manner that three series-connected zones result, of which the center zone is located within the area of the aggregate support points and surpasses the two adjoining zones as regards their strength by the use of materials of increased strength and rigidity and/or greater wall thickness.

It is already disclosed in the German Offenlegungsschrift No. 2,421,233 to impart to a longitudinal bearer a differing wall thickness course which is matched to the occurring loads. However, this Offenlegungsschrift thereby contemplates a continuous increase or decrease of the wall thickness, by means of which a uniform, continuous fold formation is to be achieved.

A good interchangeability exists with the solution according to the present invention if the zones are detachably connected with one another.

A saving in weight and a favorable introduction of the forces into the passenger cell is attained, if the zone of the longitudinal bearer on the side of the passengers has a profile open in the direction toward the fire wall and/or the subfloor and is rigidly connected with the fire wall and/or the subfloor.

In one preferred embodiment of the present invention, at least one of the zones is equipped with a profile open to the respectively associated wheel-casing sheet-metal member and is rigidly connected with the wheel-casing sheet-metal member.

Accordingly, it is an object of the present invention to provide a forward longitudinal bearer constructed as closed, hollow bearer which avoids by simple means the aforementioned shortcomings and drawbacks encountered in the prior art.

Another object of the present invention resides in a forward longitudinal bearer for motor vehicles which fulfills all requirements in a simple manner, yet can be easily repaired and is able to withstand all load situations that may occur.

A further object of the present invention resides in a forward longitudinal bearer of a motor vehicle which can be manufactured and repaired in a relatively economical manner and exhibits relatively favorable corrosion protection characteristics.

A still further object of the present invention resides in a forward longitudinal bearer constructed as closed, hollow bearer which assures a good interchangeability, has a relatively small weight and permits a favorable introduction of the forces into the passenger cell.

Still another object of the present invention resides in a forward longitudinal bearer of the type described above whose characteristics can be readily matched to prevailing load conditions without excessive expenditures.

Figure 2:
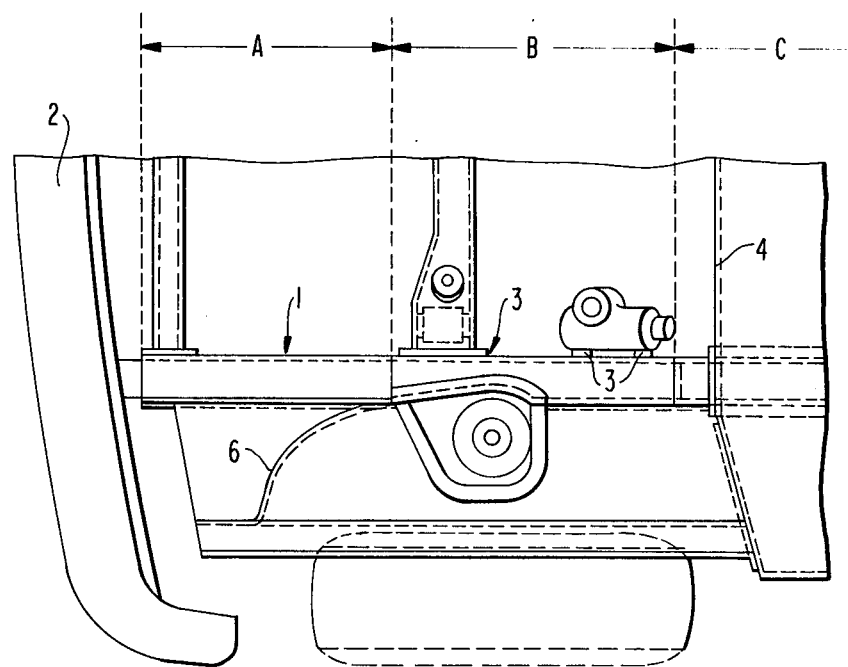

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic side elevational view of a longitudinal bearer constructed in accordance with the present invention; and FIG. 2 is a partial plan view on the arrangement according to FIG. 1.

Referring now to the drawing wherein like reference numerals are used throughout the two views to designate like parts, a longitudinal bearer generally designated by reference numeral 1 disposed in the forward area of a motor vehicle, which is not illustrated in detail, consists of the zones A, B and C, whereby the zone A has a constructively determined deformation behavior with a corresponding force interaction introduced, for example, by a bumper 2. The zone B which is provided with aggregate support points generally designated by reference numeral 3, by way of which, for example, the steering and engine support forces are introduced, absorbs additionally the loads which occur during the driving operation and is designed and constructed to offer a particularly high rigidity by the use of high strength and/or more thick-walled materials. The zone C adjoining the zone B is supported at the fire wall 4 and extends up to within the area of the subfloor 5. A wheel-casing sheet-metal panel designated by reference numeral 6 adjoins laterally the zone B and parts of the zones A and C. These zones may be provided within the associated area with an open profile, whereby the wheel-casing sheet-metal member 6 then functions as sheet metal closure member for the bearer.

The zones A, B and C may be detachably connected with each other by conventional means.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A forward longitudinal bearer of a motor vehicle constructed as a substantially closed, hollow bearer with an impact-near energy-absorbing part, characterized in that the forward longitudinal bearer is interposed between a bumper of the motor vehicle and a passenger space of the vehicle, the longitudinal bearer is divided into at least three individual sections and is assembled in such a manner so as to provide three series-connected zones with a first zone having a predetermined deformation area being arranged at a forward end of the longitudinal bearer in an area of the bumper, a second zone arranged in an area of the passenger space, and a center zone located within an area of support points for vehicle aggregates, and in that the center zone has a rigidity which exceeds a rigidity of the first and second zones.

2. A longitudinal bearer according to claim 1, characterized in that the center zone is constructed of a material having a higher strength then the material of the first and second zones so that the rigidity of the center zone exceeds the rigidity of the first and second zone.

3. A longitudinal bearer according to claim 1, characterized in that walls of the hollow bearer in the center zone have a greater thickness than walls of the hollow bearer in the first and second zones so that the rigidity of the center zone exceeds the rigidity of the first and second zone.

4. A longitudinal bearer according to claim 1, characterized in that the individual sections providing the three zones are detachably connected with one another.

5. A longitudinal bearer according to claim 4, characterized in that the zone on a side of the passenger space has an open profile and is rigidly connected with another part of the vehicle to form a closed bearer.

6. A longitudinal bearer according to claim 5, characterized in that said another part is a vehicle fire wall.

7. A longitudinal bearer according to claim 5, characterized in that said another part is a subfloor.

8. A longitudinal bearer according to claim 5, characterized in that at least one of the three zones is provided with a profile open with respect to a correspondingly coordinated wheel casing panel and is rigidly connected with the wheel casing panel.

9. A longitudinal bearer according to claim 8, characterized in that the center zone is constructed of a material of a higher strength than the material of the first and second zones so that the rigidity of the center zone exceeds the rigidity of the first and second zones.

10. A longitudinal bearer according to claim 9, characterized in that walls of the hollow bearer in the center zone have a greater thickness than walls of the hollow bearer in the first and second zones so that the rigidity of the center zone exceeds the rigidity of the first and second zones.

11. A longitudinal bearer according to claim 1, characterized in that the zone on a side of the passenger space has an open profile and is rigidly connected with another part of the vehicle to form a closed bearer.

12. A longitudinal bearer according to claim 11, characterized in that said another part is a fire wall.

13. A longitudinal bearer according to claim 11, characterized in that said another part is a subfloor.

14. A forward longitudinal bearer of a motor vehicle constructed as a substantially closed, hollow bearer with an impact-near energy-absorbing part, characterized in that the longitudinal bearer is assembled sectionwise in such a manner that three series-connected zones result, of which the center zone is located within the area of aggregate support points and has a degree of rigidity which exceeds a rigidity of the first and second zones, and in that at least one of the zones is equipped with a profile open with respect to a correspondingly coordinated wheel casing panel and is rigidly connected with said wheel casing panel.

* * * * *